United States Patent
Shibata et al.

(10) Patent No.: US 6,221,996 B1
(45) Date of Patent: Apr. 24, 2001

(54) PREPARATION OF ORGANOPLYSILOXANE GUM

(75) Inventors: Keiji Shibata; Kenji Tawara, both of Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/438,980

(22) Filed: Nov. 12, 1999

(30) Foreign Application Priority Data

Nov. 13, 1998 (JP) .................................................. 10-323437

(51) Int. Cl.⁷ ...................................................... C08G 77/06
(52) U.S. Cl. ................... 528/37; 528/14; 528/23; 556/462
(58) Field of Search ................... 528/14, 23, 37, 528/556

(56) References Cited

U.S. PATENT DOCUMENTS

| | | |
|---|---|---|
| 2,883,366 | 4/1959 | Kantor . |
| 4,439,592 | 3/1984 | Maass et al. . |
| 4,482,670 | 11/1984 | Saam . |
| 4,563,513 | 1/1986 | Inomata . |
| 4,766,191 * | 8/1988 | Gvodic et al. . |
| 4,780,519 | 10/1988 | Saam . |
| 4,831,174 * | 5/1989 | Elms . |
| 5,089,450 | 2/1992 | Watanuki . |
| 5,403,909 * | 4/1995 | Rubinsztajn et al. . |

FOREIGN PATENT DOCUMENTS

| | | |
|---|---|---|
| 0515081 | 11/1992 | (EP) . |
| 58-69228 | 4/1983 | (JP) . |
| 60-49033 | 3/1985 | (JP) . |

* cited by examiner

Primary Examiner—Robert Dawson
Assistant Examiner—Marc S. Zimmer
(74) Attorney, Agent, or Firm—Millen, White, Zelano & Branigan, P.C.

(57) ABSTRACT

An organopolysiloxane gum is prepared by polymerizing a cyclic organosiloxane with a low molecular weight, linear organopolysiloxane end-blocked with a triorganosilyl group in the presence of an alkaline catalyst. The polymerization reaction is effected under a reduced pressure, typically of 500 mmHg or lower.

20 Claims, No Drawings

PREPARATION OF ORGANOPLYSILOXANE GUM

This invention relates to a method for preparing a organopolysiloxane gum which has a minimized content of hydroxyl in the terminal unit so that the gum is suitable in various silicone rubber compositions.

BACKGROUND OF THE INVENTION

As is well known in the art, organopolysiloxane polymers are prepared, for example, by polymerizing a cyclic organosiloxane in the presence of an alkaline catalyst, optionally neutralizing the catalyst for deactivation, and distilling off low volatiles from the reaction product. The degree of polymerization of such a polymer is controlled by the amount of a low molecular weight organopolysiloxane serving as a terminal stopper. Also the terminal unit structure of the resulting organopolysiloxane depends on the structure of the terminal stopper.

However, the above-described method for preparing organopolysiloxane has the drawback that a trace amount of water in the reactant can also function as the terminal stopper. The resulting organopolysiloxane has hydroxyl groups introduced into the terminal unit, departing from the desired terminal unit. When such a high molecular weight organopolysiloxane gum having terminal hydroxyl groups is mixed with a reinforcing agent such as silica to formulate a silicone rubber compound, the compound gives rise to a crepe hardening phenomenon with the lapse of time because the bonding reaction between hydroxyl groups at the end of organopolysiloxane gum and a silica surface is accelerated. Prior to use, the silicone rubber compound having undergone crepe hardening must be restored to the initial state by applying strong shear forces.

In the application where organopolysiloxane gum is used as a base component of a silicone rubber compound, it is desired to design the organopolysiloxane gum such that its terminal unit consists of a triorganosilyl group. Nevertheless, in the currently available gums, hydroxyl groups are introduced in the terminal unit owing to incidental factors as mentioned above. For the preparation of organopolysiloxane gum, it was needed to reduce the content of hydroxyl groups.

In this regard, the conventional method for preparing organopolysiloxane gum is generally preceded by a pretreatment for removing a trace amount of water from the starting reactants such as a cyclic organosiloxane and a low molecular weight, linear organopolysiloxane. A typical pretreatment is by blowing an inert gas such as nitrogen into the reactants or drying the reactants in the presence of a desiccant such as silica gel. However, such pretreatment adds to the number of steps and renders the overall process complicated.

One known means for reducing the influence of water in the reactants is disclosed in JP-A 58-69228 wherein part of cyclic organosiloxane is distilled off in the presence of a polymerization catalyst and at a temperature at least 10° C. lower than the polymerization starting temperature. This method is also cumbersome because the complex pretreatment of the reactant is necessary.

Another technique of reducing hydroxyl groups in organopolysiloxane terminal units is by adding a triorganohalosilane and a hexaorganodisilazane for neutralizing the alkali catalyst as disclosed in JP-A 60-49033. This technique is successful in reducing hydroxyl groups, but raises the problem of metal equipment corrosion due to the use of halosilane.

Therefore, for the preparation of organopolysiloxane gum, it is desired to have a technique capable of effectively reducing the content of hydroxyl groups in the terminal unit.

SUMMARY OF THE INVENTION

An object of the invention is to provide a novel and improved method for preparing an organopolysiloxane gum having a minimized content of hydroxyl groups in the terminal unit in a simple and efficient manner.

The invention is directed to a method for preparing an organopolysiloxane gum by polymerizing a cyclic organosiloxane with a low molecular weight, linear organopolysiloxane end-blocked with a triorganosilyl group in the presence of an alkaline catalyst. This polymerization reaction is carried out under atmospheric pressure in the prior art. Quite unexpectedly, by effecting the polymerization reaction under a reduced pressure below atmospheric pressure, preferably 500 mmHg or lower, an organopolysiloxane gum substantially free of hydroxyl groups in the terminal unit can be prepared in a simple manner without a need for pretreatment and in an industrially advantageous manner without concern about equipment corrosion. The organopolysiloxane gum obtained by this method rarely invites a crepe hardening phenomenon when it is blended with a reinforcing agent such as silica to formulate a silicone rubber composition. The gum is useful as the base component in a variety of silicone rubber compositions.

Accordingly the invention provides a method for preparing an organopolysiloxane gum comprising the step of polymerizing a cyclic organosiloxane with a low molecular weight, linear organopolysiloxane end-blocked with a triorganosilyl group in the presence of an alkaline catalyst, characterized in that the polymerization reaction is effected under a reduced pressure below atmospheric pressure.

DESCRIPTION OF THE PREFERRED EMBODIMENTS

According to the invention, a cyclic organosiloxane is polymerized together with a low molecular weight, linear organopolysiloxane end-blocked with a triorganosilyl group in the presence of an alkaline catalyst to produce a high molecular weight organopolysiloxane gum.

Any well-known compounds may be used as the reactants. The preferred cyclic organosiloxane used herein is of the following formula (1).

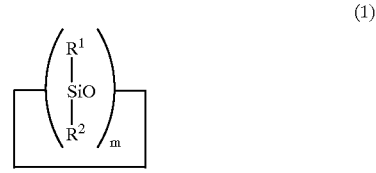

Herein, $R^1$ and $R^2$ are substituted or unsubstituted monovalent hydrocarbon groups and may be identical or different, and m is an integer of 3 to 8. $R^1$ and $R^2$ are preferably substituted or unsubstituted monovalent hydrocarbon groups of 1 to 10 carbon atoms and especially 1 to 6 carbon atoms, for example, alkyl groups such as methyl, ethyl and butyl, cycloalkyl groups such as cyclohexyl and cyclopentyl, alkenyl groups such as vinyl and allyl, aryl groups such as phenyl and xylyl, aralkyl groups such as benzyl, and substituted ones of these groups in which some or all of the hydrogen atoms are replaced by halogen atoms, mercapto, glycidoxy, (meth)acryloxy and amino groups. Preferably $R^1$ and $R^2$ are methyl, vinyl or phenyl groups.

Illustrative examples of the cyclic organosiloxane of formula (1) include hexamethylcyclotrisiloxane, octamethylcyclotetrasiloxane, decamethylcyclopentasiloxane, hexaphenylcyclotrisiloxane, octaphenylcyclotetrasiloxane, and tetramethyltetravinylcyclotetrasiloxane. These cyclic organosiloxanes may be used alone or in admixture of two or more.

The low molecular weight, linear organopolysiloxane serves as a terminal stopper for adjusting the degree of polymerization of the resulting organopolysiloxane gum. It is end-blocked with a triorganosilyl group and is preferably of the following formula (2).

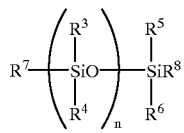

(2)

Herein, $R^3$ to $R^8$ are substituted or unsubstituted monovalent hydrocarbon groups and may be identical or different. The monovalent hydrocarbon groups represented by $R^3$ to $R^8$ are preferably those having the same number of carbon atoms as $R^1$ and $R^2$ in formula (1), with illustrative examples thereof being the same as listed above. In particular, $R^7$ and $R^8$ are preferably methyl or vinyl. The letter n is an integer of 1 to 200, preferably 10 to 100, and more preferably 20 to 80.

Preferably the low molecular weight, linear organopolysiloxane of formula (2) has a viscosity of about 1 to 500 centistokes at 25° C., and more preferably about 20 to 100 centistokes at 25° C.

The amount of the low molecular weight, linear organopolysiloxane varies with the desired degree of polymerization of the end organopolysiloxane gum and the degree of polymerization of the linear organopolysiloxane used although it is preferably about 0.01 to 10 parts, more preferably about 0.1 to 5 parts by weight per 100 parts by weight of the cyclic organosiloxane.

The alkaline catalyst is preferably selected from among alkali metal hydroxides such as sodium hydroxide, potassium hydroxide and cesium hydroxide, quaternary phosphoniums such as $(n—C_4H_9)_4POH$, quaternary ammoniums such as $(CH_3)_4NOH$, and silanolates thereof. The alkali metal hydroxides and silanolates thereof can be deactivated by acidic neutralizing agents. The quaternary phosphoniums, quaternary ammoniums, and silanolates thereof can be deactivated by thermal decomposition. Preferred among others are the dimethylpolysiloxanate of potassium hydroxide and the dimethylpolysiloxanate of tetra-n-butylphosphonium hydroxide.

The alkaline catalyst is used in a catalytic amount, preferably 0.00001 to 1 part, more preferably 0.0001 to 0.5 part by weight per 100 parts by weight of the cyclic organosiloxane.

For the polymerization or equilibration reaction using the above-described reactants, a conventional set of temperature and time, for example, about 100 to 180° C. and about ½ to 2 hours may be employed. According to the invention, this polymerization reaction is carried out under a reduced pressure below atmospheric pressure.

As opposed to the conventional polymerization reaction effected under atmospheric pressure, the invention employs a reduced pressure below atmospheric pressure for the polymerization reaction, enabling the water content to be effectively removed from the reaction system at the same time as the polymerization reaction. The reduced pressure is below atmospheric pressure, although the preferred vacuum is 500 mmHg or lower and more preferably 100 to 500 mmHg when the polymerization temperature and the vapor pressure of the reactants are taken into account. At or above atmospheric pressure, the water content cannot be fully removed, which allows for formation of hydroxyl groups in the terminal unit, failing to achieve the objects of the invention.

After the completion of polymerization reaction, the residual alkaline catalyst is preferably deactivated by either neutralization or heat decomposition depending on the type of the alkaline catalyst used. Specifically the catalyst is neutralized with an acidic neutralizing agent, for example, hydrochloric acid, ethylene chlorohydrin, acetic acid or carbon dioxide, or heated at a high temperature of 130 to 150° C. After the deactivation of the alkaline catalyst, it is preferable to distill off low volatiles from the reaction mixture.

According to the method of the invention, there is obtained a high molecular weight organopolysiloxane gum having an average degree of polymerization of 2,000 to 20,000, and especially 3,000 to 10,000.

EXAMPLE

Examples of the invention are given below by way of illustration and not by way of limitation.

Example 1

A 4-liter stainless steel reactor equipped with an agitator including a blade and a motor of a sufficient torque to agitate a high viscosity fluid was charged with 1,800 g of octamethylcyclotetrasiloxane and 9.6 g of a vinyldimethylsilyl-terminated polydimethylsiloxane having a viscosity of 60 centistokes at 25° C. and slowly heated to 110° C. over about one hour. The water content in the reactants was about 30 ppm. After the temperature reached 110° C., 3 g of dimethylpolysiloxanate containing 10% of tetra-n-butylphosphonium hydroxide was added. Polymerization reaction was effected while maintaining the reactor interior under a pressure of 200 mmHg and a temperature of 110° C. After 30 minutes, the contents were sampled out for analysis, finding that the product had a fully high molecular weight. With the pressure within the reactor kept at 200 mmHg, the reactor was heated to a higher temperature of 150 to 180° C. and kept at the temperature for 2 hours for thermally decomposing the tetra-n-butylphosphonium hydroxide. Thereafter, the pressure within the reactor was slowly lowered to 5 mmHg or below to distill off low volatiles over about 3 hours. The thus obtained organopolysiloxane was a colorless clear gum having a number average molecular weight of 440,000 and an average degree of polymerization of 6,000.

Next, 10 g of the organopolysiloxane gum was dissolved in 90 g of toluene. To this toluene solution were added 0.5 g of tetramethoxysilane and several droplets of tetrapropyl titanate. The viscosity of this solution was measured at the initial and after one hour, and the viscosity after 1 hour was divided by the initial viscosity to give a relative viscosity ratio of 1.01. The relative viscosity ratio approximate to 1 means that because of the substantial absence of hydroxyl groups in the organopolysiloxane gum, little condensation reaction took place between methoxy groups on tetramethoxysilane and hydroxyl groups, resulting in little viscosity change.

Comparative Example 1

A reactor was charged with the same amounts of octamethylcyclotetrasiloxane and vinyldimethylsilyl-terminated polydimethylsiloxane as in Example 1. The reactor was heated to a temperature of 110° C. in a nitrogen stream. The reactants were dried by continuing nitrogen flow for one hour. The water content in the reactants was about 15 ppm. Thereafter, the same amount of the dimethylpolysiloxanate of tetra-n-butylphosphonium hydroxide as in Example 1 was added. A series of steps from polymerization reaction to thermal decomposition of tetra-n-butylphosphonium hydroxide were carried out as in Example 1 except that the steps were under atmospheric pressure. An organopolysiloxane gum was prepared in this way.

The organopolysiloxane had a number average molecular weight of 350,000 and an average degree of polymerization of 4,700. Viscosity measurement was performed as in Example 1, finding a relative viscosity ratio of 1.24. The relative viscosity ratio of 1.24 suggests that the water content in the reactants was incorporated into the organopolysiloxane at its ends to form hydroxyl groups.

The results of Example 1 and Comparative Example 1 are shown in Table 1.

TABLE 1

| Reactants | | E1 | CE1 |
|---|---|---|---|
| Octamethylcyclotetrasiloxane | | 1800 g | 1800 g |
| Vinyldimethylsilyl-terminated polydimethylsiloxane (viscosity 60 cs) | | 9.6 g | 9.6 g |
| 10% tetra-n-butylphosphonium hydroxide-containing dimethylpolysiloxanate | | 3 g | 3 g |
| Reactant drying step | | not dried | dried |
| Water content in reactants | | 30 ppm | 15 ppm |
| Pressure during polymerization | | 200 mmHg | atmospheric |
| Organopolysiloxane gum | Number average molecular weight | 440,000 | 350,000 |
| | Average degree of polymerization | 6,000 | 4,700 |
| | Relative viscosity ratio | 1.01 | 1.24 |

As seen from Table 1, the organopolysiloxane gum of Example 1 prepared by the inventive method has a lower relative viscosity ratio than that of Comparative Example 1, specifically a relative viscosity ratio of approximately 1, and a higher number average molecular weight than that of Comparative Example 1. It was confirmed that an organopolysiloxane gum having the terminal unit with a minimized hydroxyl content is obtained in an efficient manner without a need for pretreatment of reactants.

Example 2

A 4-liter stainless steel reactor as used in Example 1 was charged with 1,800 g of octamethylcyclotetrasiloxane and 9.6 g of a vinyldimethylsilyl-terminated polydimethylsiloxane having a viscosity of 60 centistokes at 25° C. and slowly heated to 150° C. over about 2 hours. The water content in the reactants was about 35 ppm. After the temperature reached 150° C., 0.6 g of dimethylpolysiloxanate containing 10% of potassium hydroxide was added. Polymerization reaction was effected while maintaining the reactor interior under a pressure of 400 mmHg and a temperature of 150° C. After 2 hours, the contents were sampled out for analysis, finding that the product had a fully high molecular weight. After the completion of polymerization reaction, the reactor was relieved to atmospheric pressure. Then 0.5 g of ethylene chlorohydrin was added to the reactor, which was kept at 150° C. for one hour for fully neutralizing the potassium hydroxide. Low volatiles were then distilled off in vacuum over about 3 hours.

The thus obtained organopolysiloxane was a colorless clear gum having a number average molecular weight of 400,000 and an average degree of polymerization of 5,400. Viscosity measurement was performed as in Example 1, finding a relative viscosity ratio of 1.05.

Comparative Example 2

An organopolysiloxane gum was prepared by the same procedure as in Example 2 except that the polymerization reaction was carried out under atmospheric pressure. This organopolysiloxane gum had a number average molecular weight of 300,000, an average degree of polymerization of 4,000, and a relative viscosity ratio of 1.52.

The results of Example 2 and Comparative Example 2 are shown in Table 2.

TABLE 2

| Reactants | | E2 | CE2 |
|---|---|---|---|
| Octamethylcyclotetrasiloxane | | 1800 g | 1800 g |
| Vinyldimethylsilyl-terminated polydimethylsiloxane (viscosity 60 cs) | | 9.6 g | 9.6 g |
| 10% potassium hydroxide-containing dimethylpolysiloxanate | | 0.6 g | 0.6 g |
| Reactant drying step | | not dried | not dried |
| Water content in reactants | | 35 ppm | 35 ppm |
| Pressure during polymerization | | 400 mmHg | atmospheric |
| Organopolysiloxane gum | Number average molecular weight | 400,000 | 300,000 |
| | Average degree of polymerization | 5,400 | 4,000 |
| | Relative viscosity ratio | 1.05 | 1.52 |

As seen from Table 2, the organopolysiloxane gum of Example 2 prepared by the inventive method has a relative viscosity ratio of approximately 1, indicating an extremely reduced content of hydroxyl groups in the terminal unit. The organopolysiloxane gum obtained in Comparative Example 2 had a lower number average molecular weight than that of Example 2 and a high relative viscosity ratio because water in the reactants was incorporated into the organopolysiloxane at its ends to form hydroxyl groups.

There has been described a method for preparing an organopolysiloxane gum wherein the formation of hydroxyl groups in the terminal unit of organopolysiloxane gum can be dramatically controlled by simply effecting polymerization under reduced pressure without a need for complicated pretreatment such as drying of reactants and without concern about equipment corrosion. When the organopolysiloxane gum is blended with a reinforcing agent such as silica to formulate a silicone rubber composition, the composition is devoid of a crepe hardening phenomenon. The method is successful in producing an organopolysiloxane gum of quality in an industrially advantageous manner.

Japanese Patent Application No. 10-323437 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an organopolysiloxane gum comprising the step of polymerizing a cyclic organosiloxane with a low molecular weight, linear organopolysiloxane end-blocked with a triorganosilyl group in the presence of an alkaline catalyst wherein the polymerization reaction is effected under a reduced pressure below atmospheric pressure.

2. The method of claim 1 wherein the polymerization reaction is effected under a reduced pressure of up to 500 mmHg.

3. The method of claim 1 wherein said alkaline catalyst is selected from the group consisting of alkali metal hydroxides, quaternary phosphoniums, quaternary ammoniums, and silanolates thereof.

4. The method of claim 3 wherein said alkaline catalyst is the dimethylpolysiloxanate of potassium hydroxide or the dimethylpolysiloxanate of tetra-n-butylphosphonium hydroxide.

5. The method of claim 2, wherein said reduced pressure is from 100 to 500 mmHg.

6. The method of claim 1, wherein the cyclic organosiloxane is a compound of formula (1)

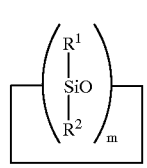

wherein $R^1$ and $R_2$ are each independently substituted or unsubstituted monovalent hydrocarbon groups, and m is an integer of 3 to 8.

7. The method of claim 6, wherein $R^1$ and $R^2$ have 1 to 10 carbon atoms, and are alkyl, cycloalkyl, alkenyl, aryl, or aralkyl groups.

8. The method of claim 6, wherein $R^1$ and $R^2$ are methyl, ethyl, butyl, cyclohexyl, cyclopentyl, allyl, xylyl, or benzyl.

9. The method of claim 6, wherein $R^1$ and $R^2$ are substituted so that some or all of the hydrogen atoms are replaced by halogen atoms, or mercapto, glycidoxy, (meth)acryloxy or amino groups.

10. The method of claim 6, wherein $R^1$ and $R^2$ are methyl, vinyl or phenyl groups.

11. The method of claim 1, wherein the triorganosilyl group is a compound of formula (2)

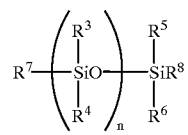

wherein $R^3$ to $R^8$ are each independently substituted or unsubstituted monovalent hydrocarbon groups, and n is an integer of 1 to 200.

12. The method of claim 11, wherein $R^3$ to $R^8$ have 1 to 10 carbon atoms, and are alkyl, cycloalkyl, alkenyl, aryl, or aralkyl groups.

13. The method of claim 11, wherein $R^7$ and $R^8$ are methyl or vinyl.

14. The method of claim 11, wherein n is a integer of 10 to 100.

15. The method of claim 11, wherein the compound of formula 2 has a viscosity of about 1 to 500 centistokes at 25° C.

16. The method of claim 15, wherein said viscosity is 20 to 100 centistokes at 25° C.

17. The method of claim 1, wherein the amount of the low molecular weight, linear organopolysiloxane is 0.01 to 10 parts by weight per 100 parts by weight of the cyclic organosiloxane.

18. The method of claim 1, wherein the amount of the low molecular weight, linear organopolysiloxane is 0.1 to 5 parts by weight per 100 parts by weight of the cyclic organosiloxane.

19. The method of claim 1, wherein the amount of the alkaline catalyst is from 0.00001 to 1 part by weight per 100 parts by weight of the cyclic organosiloxane.

20. The method of claim 1, wherein the amount of the alkaline catalyst is from 0.0001 to 0.5 part by weight per 100 parts by weight of the cyclic organosiloxane.

* * * * *